(12) United States Patent
Zhuang et al.

(10) Patent No.: US 12,720,417 B2
(45) Date of Patent: Aug. 25, 2026

(54) METHOD FOR DATA TRANSMISSION, GATEWAY AND BLUETOOTH TAG

(71) Applicant: SHENZHEN MINEW TECHNOLOGIES CO LTD, Shenzhen (CN)

(72) Inventors: Yan Zhuang, Shenzhen (CN); Yingxiang Lin, Shenzhen (CN)

(73) Assignee: SHENZHEN MINEW TECHNOLOGIES CO LTD, Shenzhen (CN)

( * ) Notice: Subject to any disclaimer, the term of this patent is extended or adjusted under 35 U.S.C. 154(b) by 327 days.

(21) Appl. No.: 18/541,687

(22) Filed: Dec. 15, 2023

(65) Prior Publication Data

US 2024/0214909 A1 Jun. 27, 2024

(30) Foreign Application Priority Data

Dec. 22, 2022 (CN) ......................... 202211659460.6

(51) Int. Cl.
*H04W 48/10* (2009.01)
*H04W 52/02* (2009.01)
*H04W 76/10* (2018.01)

(52) U.S. Cl.
CPC ....... *H04W 48/10* (2013.01); *H04W 52/0229* (2013.01); *H04W 76/10* (2018.02)

(58) Field of Classification Search
CPC ..................................................... H04W 48/10
See application file for complete search history.

(56) References Cited

U.S. PATENT DOCUMENTS 12,262,308 B2 * 3/2025 Le ......................... H04W 48/16
12,412,465 B1 * 9/2025 Daoura .................. H04W 4/80
(Continued)

FOREIGN PATENT DOCUMENTS

CN 1859516 A 11/2006
CN 106793007 A 5/2017
(Continued)

OTHER PUBLICATIONS

First Review Comments, for CN application First Review Comments, prepared by State Intellectual Property Office (SIPO), China, dated Jan. 16, 2026, 14 pages including an English Translation.

*Primary Examiner* — Guang W Li
(74) *Attorney, Agent, or Firm* — Brooks Kushman P.C.

(57) ABSTRACT

A method for data transmission, a gateway, and a Bluetooth tag. The method for data transmission includes: receiving, by the gateway, a Bluetooth-tag-accessible broadcast package from a first Bluetooth tag, where the gateway does not receive command data of the first Bluetooth tag from a server before receiving the Bluetooth-tag-accessible broadcast package from the first Bluetooth tag, the command data is used for transmitting data, the Bluetooth-tag-accessible broadcast package is used to indicate that the Bluetooth tag is in an accessible state; transmitting, by the gateway, a connection request message to the first Bluetooth tag according to the Bluetooth-tag-accessible broadcast package from the first Bluetooth tag; and transmitting, by the gateway, the command data to the first Bluetooth tag when receiving a connection request acknowledgement message from the first Bluetooth tag.

8 Claims, 4 Drawing Sheets

(56) References Cited

U.S. PATENT DOCUMENTS

| | | | | |
|---|---|---|---|---|
| 2012/0077593 | A1* | 3/2012 | Sarmenta | A63F 13/98 463/40 |
| 2014/0148195 | A1* | 5/2014 | Bassan-Eskenazi | H04W 4/023 455/456.1 |
| 2016/0219507 | A1* | 7/2016 | Hughes | H04W 52/02 |
| 2018/0020323 | A1* | 1/2018 | Yu | H04W 4/029 |
| 2018/0091725 | A1* | 3/2018 | Ishikuri | H04W 76/16 |
| 2018/0167982 | A1* | 6/2018 | Lee | H04W 28/02 |
| 2019/0087612 | A1* | 3/2019 | Sengstaken, Jr. | A61J 1/035 |
| 2019/0215879 | A1 | 7/2019 | Song et al. | |
| 2020/0184977 | A1* | 6/2020 | Song | H04W 4/80 |
| 2024/0259766 | A1* | 8/2024 | Hu | H04W 4/70 |
| 2025/0151134 | A1* | 5/2025 | Xu | H04W 76/10 |
| 2025/0227791 | A1* | 7/2025 | Tian | H04B 5/70 |

FOREIGN PATENT DOCUMENTS

| | | | |
|---|---|---|---|
| CN | 109089250 | A | 12/2018 |
| CN | 109151787 | A | 1/2019 |
| CN | 110213756 | A | 9/2019 |
| CN | 110351695 | A | 10/2019 |
| CN | 110446196 | A | 11/2019 |
| CN | 111399389 | A | 7/2020 |
| CN | 113038438 | A | 6/2021 |
| CN | 113163345 | A | 7/2021 |
| CN | 113746725 | A | 12/2021 |
| WO | 2021218223 | A1 | 11/2021 |

* cited by examiner

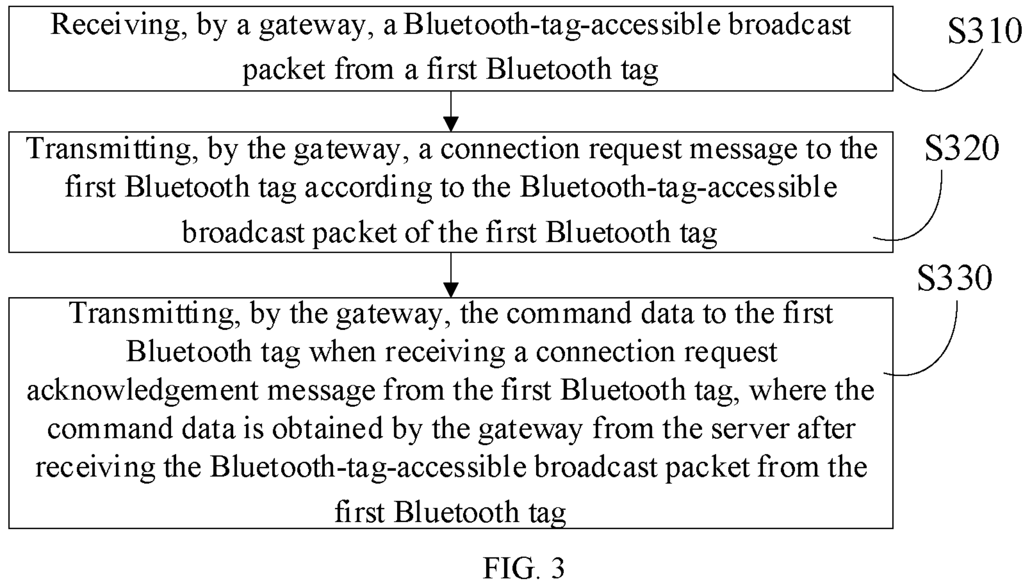

FIG. 3

Broadcasting a Bluetooth-tag-accessible broadcast packet by a first Bluetooth tag after a wake-up signal is monitored by the first Bluetooth tag

S410

Receiving, by the first Bluetooth tag, a plurality of connection request messages from a plurality of gateways, the plurality of gateways correspond to the plurality of connection request messages respectively

S420

Transmitting, by the first Bluetooth tag, a connection request acknowledgement message to a target gateway, the target gateway is a gateway corresponding to a connection request message in the plurality of connection request messages, which is first received by the first Bluetooth tag

S430

Receiving, by the first Bluetooth tag, command data from the target gateway

METHOD FOR DATA TRANSMISSION, GATEWAY AND BLUETOOTH TAG

CROSS-REFERENCE TO RELATED APPLICATION

Pursuant to 35 U.S.C. § 119 and the Paris Conversion, this application claims priority to Chinese Patent Application No. 202211659460.6 filed on Dec. 22, 2022, the entire contents of which are incorporated herein by reference.

FIELD

The present disclosure relates to the field of data transmission technologies, and more particularly, to a method for data transmission, a gateway and a Bluetooth tag.

BACKGROUND

The statements provided herein are merely background information related to the present disclosure, and do not necessarily constitute any prior arts. A gateway with Bluetooth module is generally used in conjunction with a Bluetooth tag. Gateway is also referred to as a network-to-network connector or a protocol converter, which is a computer system or a computer device that provides data conversion service among multiple network devices and can be used to enable a downstream Bluetooth tag to be connected with a server. The Bluetooth tag is a tag that can periodically transmit a broadcast signal carrying a feature code thereof. When the server needs to obtain information of the Bluetooth tag, the server may transmit command data to the Bluetooth tag through the gateway so as to obtain the tag information.

In the related art, in a usage scenario of a plurality of gateways, when the server needs to transmit data to the Bluetooth tag, the server designates a gateway from the plurality of gateways for the Bluetooth tag, and transmits command data of the Bluetooth tag to the designated gateway. After receiving Bluetooth-tag-accessible broadcast package from the Bluetooth tag, the designated gateway establishes a connection with the Bluetooth tag, and transmits the command data to the Bluetooth tag after the connection is successfully established. In this process, a connection for data transmission between the designated gateway and the corresponding Bluetooth tag may not be established due to communication quality or distance of communication, thus, the gateway cannot transmit the command data to the Bluetooth tag in time, and the reliability and the stability of data transmission between the gateway and the first Bluetooth tag are affected accordingly.

SUMMARY

A method for data transmission, a gateway and a Bluetooth tag are provided in the present disclosure. The aforesaid method for data transmission may enable a plurality of gateways to establish a connection with the first Bluetooth tag respectively, and transmit command data to the first Bluetooth tag in time, thereby improving the reliability and stability of data transmission between the plurality of gateways and the first Bluetooth tag.

In order to solve the problem mentioned above, in the first aspect, a method for data transmission is provided. The method includes: receiving, by a gateway, a Bluetooth-tag-accessible broadcast package from a first Bluetooth tag, the gateway does not receive command data of the first Bluetooth tag from a server before receiving the Bluetooth-tag-accessible broadcast package from the first Bluetooth tag, the command data is used for transmitting data, and the Bluetooth-tag-accessible broadcast package is used to indicate that the Bluetooth tag is in an accessible state; transmitting, by the gateway, a connection request message to the first Bluetooth tag according to the Bluetooth-tag-accessible broadcast package from the first Bluetooth tag; and transmitting, by the gateway, the command data to the first Bluetooth tag when receiving a connection request acknowledgement message from the first Bluetooth tag, the command data is obtained by the gateway from the server, after receiving the Bluetooth-tag-accessible broadcast package from the first Bluetooth tag.

In one embodiment, when the Bluetooth-tag-accessible broadcast package from the first Bluetooth tag is received by the gateway, the method further includes: receiving, by the gateway, a Bluetooth-tag-accessible broadcast package from at least one second Bluetooth tag, both the Bluetooth-tag-accessible broadcast package from the first Bluetooth tag and the Bluetooth-tag-accessible broadcast package from each of the at least one second Bluetooth tag include sleep countdown information, the sleep countdown information indicates a countdown time for triggering a corresponding Bluetooth tag to enter a sleep mode. Said transmitting, by the gateway, the connection request message to the first Bluetooth tag according to the Bluetooth-tag-accessible broadcast package from the first Bluetooth tag includes: transmitting, by the gateway, the connection request message to the first Bluetooth tag, when a countdown time duration indicated by the sleep countdown information corresponding to the first Bluetooth tag is less than a countdown time duration indicated by the sleep countdown information corresponding to each of the at least one second Bluetooth tag.

In one embodiment, when the Bluetooth-tag-accessible broadcast package from the first Bluetooth tag is received by the gateway, the method further includes: receiving, by the gateway, Bluetooth-tag-accessible broadcast package(s) from at least one second Bluetooth tag; and determining, by the gateway, a signal strength value of the Bluetooth-tag-accessible broadcast package from the first Bluetooth tag and a signal strength value of the Bluetooth-tag-accessible broadcast package from each of the at least one second Bluetooth tag. Said transmitting, by the gateway, the connection request message to the first Bluetooth tag according to the Bluetooth-tag-accessible broadcast package from the first Bluetooth tag includes: transmitting, by the gateway, the connection request message to the first Bluetooth tag, when the signal strength value corresponding to the first Bluetooth tag is greater than the signal strength value corresponding to each of the at least one second Bluetooth tag.

In one embodiment, before the Bluetooth-tag-accessible broadcast package from the first Bluetooth tag is received by the gateway, the method further includes: receiving, by the gateway, a wakeup command of the first Bluetooth tag from the server; and transmitting, by the gateway, a wakeup signal to the first Bluetooth tag according to the wakeup command of the first Bluetooth tag. The wakeup signal is used to enable the Bluetooth tag to be awakened from a sleep state.

In one embodiment, before receiving the Bluetooth-tag-accessible broadcast package from the first Bluetooth tag and the Bluetooth-tag-accessible broadcast package(s) from the at least one second Bluetooth tag by the gateway, the method further includes: receiving, by the gateway, a wakeup command of the first Bluetooth tag and a wakeup command of each of the at least one second Bluetooth tag from the server; and transmitting, by the gateway, a wakeup signal to the first Bluetooth tag according to the wakeup command of the first Bluetooth tag, and transmitting, by the gateway, a wakeup signal to each of the at least one second Bluetooth tag according to the wakeup command of each of the at least one second Bluetooth tag. The wakeup signal is used to enable the Bluetooth tag to be awakened from a sleep state.

In one embodiment, the method further includes:

stopping transmitting the connection request message to the first Bluetooth tag by the gateway when receiving a Bluetooth-tag-inaccessible broadcast package from the first Bluetooth tag. The Bluetooth-tag-inaccessible broadcast package is used to indicate that the Bluetooth tag is in an inaccessible state.

In combination with the first aspect, in some embodiments of the first aspect, the gateway is within a preset distance range of the first Bluetooth tag.

In a second aspect, a method for data transmission is provided in the present disclosure. The method for data transmission includes:

broadcasting a Bluetooth-tag-accessible broadcast package by a first Bluetooth tag after a wakeup signal is monitored by the first Bluetooth tag, the Bluetooth-tag-accessible broadcast package is used to indicate that the Bluetooth tag is in an accessible state; receiving, by the first Bluetooth tag, a plurality of connection request messages from a plurality of gateways respectively; transmitting a connection request acknowledgement message to a target gateway by the first Bluetooth tag, the target gateway is a gateway corresponding to one of the plurality of connection request messages which is first received by the first Bluetooth tag; and receiving, by the first Bluetooth tag, command data from the target gateway. The command data is used for transmitting data.

In one embodiment, after said transmitting, by the first Bluetooth tag, the connection request acknowledgement message to the target gateway, the method further includes: broadcasting a Bluetooth-tag-inaccessible broadcast package by the first Bluetooth tag. The Bluetooth-tag-inaccessible broadcast package is used to indicate that the Bluetooth tag is in an inaccessible state.

In a third aspect, a gateway is provided in the embodiments of the present disclosure. The gateway includes: a first receiver configured to receive a Bluetooth-tag-accessible broadcast package from a first Bluetooth tag, the gateway does not receive command data of the first Bluetooth tag from a server before receiving the Bluetooth-tag-accessible broadcast package from the first Bluetooth tag, the command data is used for transmitting data, and the Bluetooth-tag-accessible broadcast package is used to indicate that the Bluetooth tag is in an accessible state; and a first transmitter configured to transmit a connection request message to the first Bluetooth tag according to the Bluetooth-tag-accessible broadcast package from the first Bluetooth tag. The first transmitter is further configured to transmit the command data to the first Bluetooth tag when receiving a connection request acknowledgement message from the first Bluetooth tag, the command data is obtained by the gateway from the server after receiving the Bluetooth-tag-accessible broadcast package from the first Bluetooth tag.

In one embodiment, the gateway further includes a processor, the first receiver is further configured to receive Bluetooth-tag-accessible broadcast package(s) from at least one second Bluetooth tag. Both the Bluetooth-tag-accessible broadcast package from the first Bluetooth tag and the Bluetooth-tag-accessible broadcast package(s) corresponding to the at least one second Bluetooth tag include sleep countdown information, the sleep countdown information indicates a countdown time for triggering the corresponding Bluetooth tag to enter a sleep mode. The first transmitter is particularly configured to transmit a connection request message to the first Bluetooth tag when the processor determines that a time duration indicated by the sleep countdown information corresponding to the first Bluetooth tag is less than a time duration indicated by the sleep countdown information corresponding to each of the at least one second Bluetooth tag.

In one embodiment, the gateway further includes a processor, and the first receiver is further configured to receive a Bluetooth-tag-accessible broadcast package from the at least one second Bluetooth tag. The processor is configured to determine a signal strength value of the Bluetooth-tag-accessible broadcast package from the first Bluetooth tag and a signal strength value of the Bluetooth-tag-accessible broadcast package from each of the at least one second Bluetooth tag. The first transmitter is particularly configured to transmit a connection request message to the first Bluetooth tag when the processor determines that the signal strength value corresponding to the first Bluetooth tag is greater than the signal strength value corresponding to each of the at least one second Bluetooth tag.

In one embodiment, before the Bluetooth-tag-accessible broadcast package from the first Bluetooth tag is received by the first receiver, the first receiver is further configured to: receive a wakeup command of the first Bluetooth tag from a server; and transmit a wakeup signal to the first Bluetooth tag according to the wakeup command of the first Bluetooth tag. The wakeup signal is used to enable the Bluetooth tag to be awakened from a sleep state.

In combination with the third aspect, in some embodiments of the third aspect, before the Bluetooth-tag-accessible broadcast package from the first Bluetooth tag and the Bluetooth-tag-accessible broadcast package of the at least one second Bluetooth tag are received by the first receiver, the first receiver is further configured to: receive a wakeup command of the first Bluetooth tag and a wakeup command of each of the at least one second Bluetooth tag from the server. The first transmitter is further configured to transmit a wakeup signal to the first Bluetooth tag according to the wakeup command of the first Bluetooth tag and transmit a wakeup signal to each of the at least one second Bluetooth tag according to the wakeup command of each of the at least one second Bluetooth tag. The wakeup signal is used to enable the Bluetooth tag to be awakened from the sleep state.

In one embodiment, the first transmitter is further configured to stop transmitting a connection request message to the first Bluetooth tag when receiving a Bluetooth-tag-inaccessible broadcast package from the first Bluetooth tag. The Bluetooth-tag-inaccessible broadcast package is used to indicate that the first Bluetooth tag is in an inaccessible state.

In one embodiment, the gateway is within a preset distance range of the first Bluetooth tag.

In the fourth aspect, a Bluetooth tag is provided in the present disclosure. The Bluetooth tag includes: a second transmitter configured to broadcast a Bluetooth-tag-accessible broadcast package after monitoring a wakeup signal, the Bluetooth-tag-accessible broadcast package is used to indicate that the Bluetooth tag is in an accessible state; and a second receiver configured to receive a plurality of connection request messages from a plurality of gateways respectively. The second transmitter is further configured to transmit a connection request acknowledgement message to a target gateway, the target gateway is a gateway corresponding to one of the plurality of connection request messages which is first received by the Bluetooth tag. The second receiver is further configured to receive command data from the target gateway.

In one embodiment, after the second transmitter transmits the connection request acknowledge message to the target gateway, the second transmitter is further configured to broadcast a Bluetooth-tag-inaccessible broadcast package, the Bluetooth-tag-inaccessible broadcast package is used to indicate that the Bluetooth tag is in an inaccessible state.

In the fifth aspect, a gateway is further provided in the present disclosure. The gateway includes at least one processor, the at least one processor is configured to be coupled to a memory, read and execute instructions in the memory to implement the method for data transmission in the first aspect.

In the sixth aspect, a Bluetooth tag is further provided in the present disclosure. The Bluetooth tag includes at least one processor, the processor is configured to be coupled to a memory, read and execute instructions in the memory, to implement the method for data transmission in the second aspect.

In the seventh aspect, a non-transitory computer-readable storage medium is further provided in the present disclosure. The non-transitory computer-readable storage medium stores a computer program, that, when being executed by a computer, causes the computer to perform the method for data transmission in the first aspect or perform the method for data transmission in the second aspect.

According to the method for data transmission provided in the embodiments of the present disclosure, the gateway receives the Bluetooth-tag-accessible broadcast package from the first Bluetooth tag, obtains the command data of the first Bluetooth tag from the server after receiving the Bluetooth-tag-accessible broadcast package from the first Bluetooth tag, and establishes the connection with the first Bluetooth tag. After the gateway successfully establishes the connection with the first Bluetooth tag, the gateway transmits the command data to the first Bluetooth tag. According to the method for data transmission, the gateway obtains the command data of the first Bluetooth tag from the server after receiving the Bluetooth-tag-accessible broadcast package from the first Bluetooth tag. Thus, the plurality of gateways which receive the Bluetooth-tag-accessible broadcast package from the first Bluetooth tag are all allowed to transmit the connection request message to the first Bluetooth tag, thereby ensuring that one of the plurality of gateways is enabled to successfully establish a connection with the first Bluetooth tag, and transmit the command data to the first Bluetooth tag in time. In this way, a problem that the target gateway cannot transmit command data to the first Bluetooth tag in time caused due to the fact that the target gateway cannot successfully establish the connection with the Bluetooth tag in the related art can be avoided, the reliability and the stability of data transmission between the gateways and the first Bluetooth tag are improved.

BRIEF DESCRIPTION OF THE DRAWINGS

In order to describe the embodiments of the present disclosure or the prior art more clearly, a brief introduction regarding the accompanying drawings that need to be used for describing the embodiments of the present disclosure or the prior art is given below. It is obvious that the accompanying drawings described below are merely some embodiments of the present disclosure, for a person of ordinary skill in the art, other drawings may also be obtained according to the current drawings without paying creative efforts.

FIG. 3 illustrates one schematic flow diagram of the method for data transmission provided in one embodiment of the present disclosure;

FIG. 4 illustrates another schematic flow diagram of the method for data transmission provided in one embodiment of the present disclosure;

DETAILED DESCRIPTION OF EMBODIMENTS

The technical solutions in the present disclosure will be described with reference to the accompanying drawings below. It is obvious that, the embodiments described below are only some embodiments of the present disclosure, rather than the entirety of the embodiments.

In the following descriptions, in order to describe but not intended to limit the present disclosure, concrete details including specific system structure and technique are proposed to facilitate a comprehensive understanding of the embodiments of the present disclosure. However, a person of ordinarily skill in the art should understand that, the present disclosure can also be implemented in some other embodiments from which these concrete details are excluded. In other conditions, detailed explanations of method, circuit, device and system well known to the public are omitted, such that unnecessary details which are disadvantageous to understanding of the description of the present disclosure can be avoided.

The term "comprise" in the context indicates existence of the described characteristics, integer, steps, operations, elements and/or components, but does not exclude existence or adding of one or more other characteristics, integer, steps, operations, elements, components and/or combination thereof. The terms of "comprising", "including", "having" and their variations mean "including but is not limited to", unless otherwise they are specially emphasized in other manner.

The phrase of "and/or" in the context is merely an association relationship for describing associated objects, and indicates that three relationships may exist. For example, A and/or B may represent that A exists alone, A and B exist at the same time, and B exists alone. In addition, the character "/" generally indicates that there is a "or" relationship between two continuous associated objects.

In the description of the present disclosure, it should be understood that, terms of "the first" and "the second" are only used for description purposes, and should not be considered as indicating or implying any relative importance, or implicitly indicating the number of indicated technical features. As such, technical feature(s) restricted by "the first" or "the second" can explicitly or implicitly include one or plurality of said technical feature(s). In the description of the present disclosure, "at least one" means one or plural, "a plurality of" has the meaning of two or more, unless there is additional explicit and specific limitation.

Figure 1:
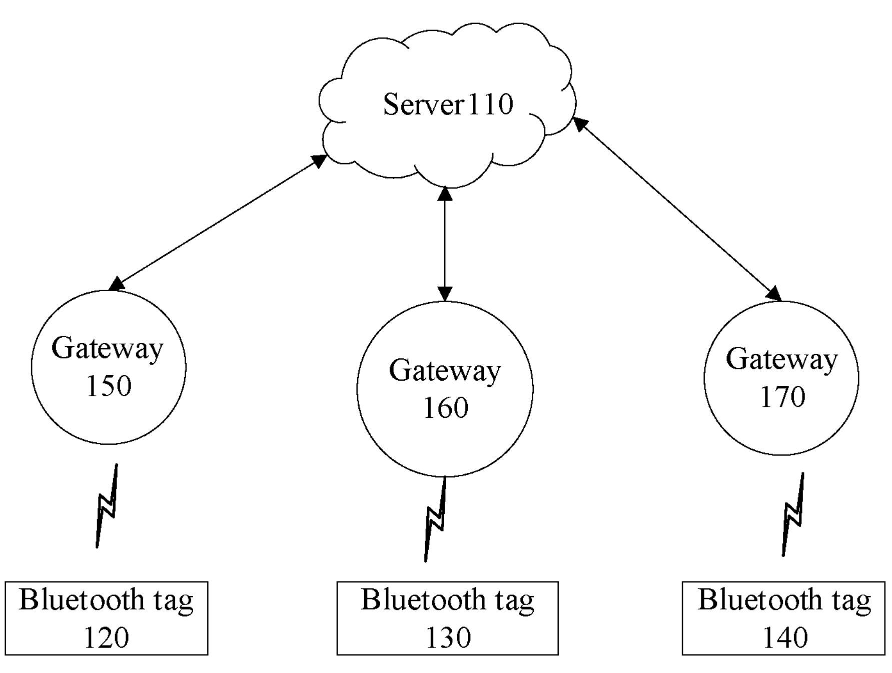
FIG. 1 illustrates a schematic diagram of a communication system applicable to a method for data transmission provided in one embodiment of the present disclosure.

In order to better illustrate the method for data transmission provided in the embodiments of the present disclosure, a conventional method for transmitting command data is described first with reference to a communication system shown in FIG. 1.

FIG. 1 illustrates a schematic diagram of the communication system provided in the present disclosure. As shown in FIG. 1, the communication system may include a server 110, at least one Bluetooth tag (i.e., a Bluetooth tag 120, a Bluetooth tag 130 and a Bluetooth tag 140 as shown in FIG. 1), and a plurality of gateways (a gateway 150, a gateway 160 and a gateway 170 as shown in FIG. 1).

The gateway (e.g., one of the gateway 150, the gateway 160 and the gateway 170) may also be referred to as a network-to-network connector or a protocol converter, which is a computer system or computer device that provides data conversion service among multiple network devices. The Bluetooth tag (e.g., any of the Bluetooth tag 120, the Bluetooth tag 130 and the Bluetooth tag 140) may communicate with the gateway through Bluetooth connection. The server 110 may be a cloud server, a physical server, a cloud platform, or the like.

In particular, when the server 110 needs to transmit command data to a certain Bluetooth tag, the server 110 selects one gateway from the plurality of gateways, and transmits the command data of the Bluetooth tag to the selected gateway. For example, when the server 110 needs to transmit the command data of the Bluetooth tag 130, the server 110 may select the gateway 160 from the gateway 150, the gateway 160 and the gateway 170, and transmit the command data of the Bluetooth tag 130 to the gateway 160. After receiving the Bluetooth-tag-accessible broadcast package from the Bluetooth tag 130, the gateway 160 establishes a connection with the Bluetooth tag 130 and transmits the command data to the Bluetooth tag 130 after the connection is successfully established. In this process, although the gateway 150 and the gateway 170 receive the Bluetooth-tag-accessible broadcast package from the Bluetooth tag 130 either, only the gateway 160 has the command data of the Bluetooth tag 130. Thus, only the gateway 160 establishes the connection with the Bluetooth tag 130. In this condition, if the gateway 160 fails to establish the connection with the Bluetooth tag 130, the gateway 160 may not transmit the command data to the Bluetooth tag 130 in time, the reliability and the stability of data transmission are affected.

Figure 2:
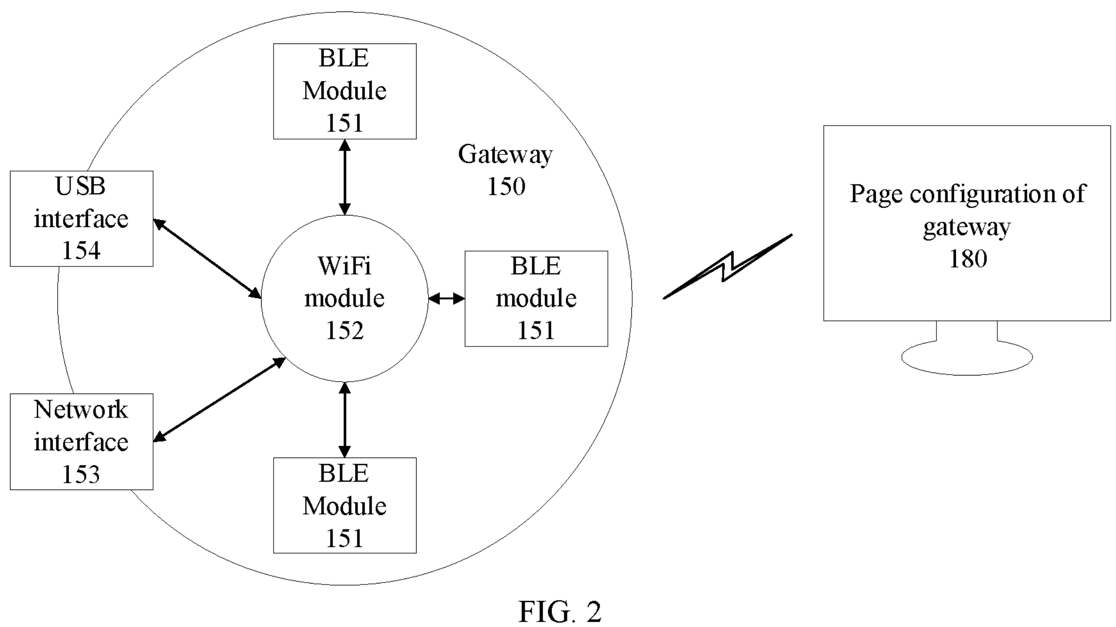
FIG. 2 illustrates a schematic structural diagram of a gateway provided in one embodiment of the present disclosure.

In some embodiments, as shown in FIG. 2, the gateway (taking the gateway 150 as an example) may include a network interface 153, a wireless fidelity (Wi-Fi) module 152, at least one Bluetooth module 151, a universal serial bus (USB) interface 154. As an example, the Bluetooth module 151 may be a classic Bluetooth, or a Bluetooth low energy (Bluetooth low energy, BLE), etc.

The network interface 153 may be connected to a network cable, and establish a connection with the server 110 for information interaction according to a preset communication protocol. For example, the connection between the network interface 153 and a message queue telemetry transport (MQTT) server is established for information interaction according to message queue telemetry transport (message queue telemetry transport, MQTT) protocol. As an example, after the gateway 150 is powered on, the gateway 150 may initiate a connection request to the server 110 according to the MQTT communication protocol. If the gateway 150 is not successfully connected to the server 110, the gateway 150 may reconnect to the server after a preset time until the connection is successfully established. If the gateway 150 is successfully connected to the server 110, the gateway 150 may transmit a reminder message to the server 110 to remind the server 110 of a condition that the gateway 150 is ready to perform information interaction. The USB interface 154 may read data from the USB flash disk and write data into the USB flash disk.

The Wi-Fi module 152 may be connected to the at least one Bluetooth module 151 through a universal asynchronous receiver/transmitter (UART) serial port, and is configured to control the Bluetooth module 151 (e.g., a BLE module) to establish a connection with a Bluetooth tag (e.g., the Bluetooth tag 120) for data transmission.

As an example, in some embodiments, a page configuration of a gateway may be provided in the Wi-Fi module 152, and a user may perform information interaction with the Wi-Fi module 152 through a terminal device 180 such as a mobile phone, a notebook, access webpage configuration page of the gateway, and configure the gateway.

In view of the problem of data transmission between a traditional server, a gateway and a Bluetooth tag described above, a method for data transmission is provided in the embodiments of the present disclosure, this method for data transmission enables a plurality of gateways receiving a Bluetooth-tag-accessible broadcast package from a first Bluetooth tag to transmit a connection request message to the first Bluetooth tag, so as to ensure that one of the plurality of gateways can successfully establish a connection with the first Bluetooth tag and transmit command data to the first Bluetooth tag in time. In this way, a problem that the gateway cannot transmit the command data to the Bluetooth tag in time due to the fact that the gateway is not successfully connected with the Bluetooth tag in the related art can be avoided, and the reliability and the stability of data transmission are improved.

A method for data transmission implemented by a gateway provided in one embodiment of the present disclosure is described below with reference to FIG. 3. As shown in FIG. 3, the method for data transmission includes the following steps:

At step 310, the gateway receives a Bluetooth-tag-accessible broadcast package from the first Bluetooth tag.

At step 322, the gateway transmits a connection request message to the first Bluetooth tag according to the Bluetooth-tag-accessible broadcast package from the first Bluetooth tag.

At step 330, the gateway transmits command data of the first Bluetooth tag to the first Bluetooth tag, when receiving a connection request acknowledgement message from the first Bluetooth tag.

After receiving the Bluetooth-tag-accessible broadcast package from the first Bluetooth tag, the gateway obtains the command data of the first Bluetooth tag from the server. The gateway does not receive the command data of the first Bluetooth tag from the server before receiving the Bluetooth-tag-accessible broadcast package from the first Bluetooth tag. The command data may include data that needs to be transmitted to the first Bluetooth tag by the server, and is configured to transmit data.

For example, the gateway may obtain the command data of the first Bluetooth tag from the server after receiving the Bluetooth-tag-accessible broadcast package from the first Bluetooth tag and before transmitting the connection request message to the first Bluetooth tag. The gateway may also obtain the command data of the first Bluetooth tag from the server after transmitting the connection request message to the first Bluetooth tag and before receiving the connection request acknowledgement message from the first Bluetooth tag. The gateway may also obtain the command data of the first Bluetooth tag from the server after receiving the connection request acknowledgement message from the first Bluetooth tag. In order to ensure the security of data transmission, the gateway is within a preset distance range of the first Bluetooth tag.

The gateway is enabled to obtain the command data of the first Bluetooth tag from the server after receiving the Bluetooth-tag-accessible broadcast package from the first Bluetooth tag, such that the plurality of gateways receiving the Bluetooth-tag-accessible broadcast package from the first Bluetooth tag are enabled to transmit the connection request message to the first Bluetooth tag. As compared to a data transmission method for transmitting the command data of the first Bluetooth tag to the first Bluetooth tag through a designated gateway, the method for data transmission provided in the present disclosure can avoid the problem that the gateway cannot transmit the command data to the first Bluetooth tag in time due to the fact that the designated gateway is not successfully connected to the Bluetooth tag.

For example, in an application scenario shown in FIG. 1, when the server 110 needs to transmit data to the Bluetooth tag 120, each of the gateway 150, the gateway 160, and the gateway 170 can transmit a connection request message to the Bluetooth tag 120 after receiving the Bluetooth-tag-accessible broadcast package of the Bluetooth tag 120, and establish a connection with the Bluetooth tag 120. In this way, the command data of the Bluetooth tag 120 may also be transmitted to the Bluetooth tag 120 in time through the gateway 160 or the gateway 170 even if the gateway 150 is malfunctioned.

The Bluetooth-tag-accessible broadcast package is used to indicate that the Bluetooth tag is in an accessible state. It should be noted that, in order to achieve an energy conservation effect, the Bluetooth tag is in a sleep state generally, and the Bluetooth tag in the sleep state may operate with extremely low power consumption. In this situation, the Bluetooth tag is in an inaccessible state, and the gateway cannot establish a connection with the Bluetooth tag. However, the Bluetooth tag may periodically monitor a wakeup signal. The wakeup signal is used to enable the Bluetooth tag to be awakened from the sleep state. That is, the Bluetooth tag monitors the wakeup signal regularly at a regular time period, and determines whether there exists a gateway that wakens it (i.e., the Bluetooth tag itself). If the Bluetooth tag may monitor the wakeup signal, the Bluetooth tag gets out from the sleep state and broadcasts the Bluetooth-tag-accessible broadcast package. In this situation, the Bluetooth tag is in the accessible state and may establish a connection with the gateway. If the Bluetooth tag fails to monitor the wakeup signal, the Bluetooth tag continues to be in the sleep state.

As an example, in some embodiments, the gateway further receives a wakeup command of the first Bluetooth tag from the server, and transmits the wakeup signal to the first Bluetooth tag according to the wakeup command of the first Bluetooth tag, in order to enable the first Bluetooth tag to be in the accessible state.

In one application scenario including the plurality of gateways, the gateway which transmits the wakeup signal to the first Bluetooth tag and the gateway which transmits the connection request message to the first Bluetooth tag may be the same gateway, or be different gateways. For example, in the application scenario shown in FIG. 1, the gateway 150 may be enabled to transmit a wakeup signal to the Bluetooth tag 120, in order that the Bluetooth tag 120 broadcasts the Bluetooth-tag-accessible broadcast package. After the Bluetooth tag 120 broadcasts the Bluetooth-tag-accessible broadcast package, each of the gateway 150, the gateway 160, and the gateway 170 may receive the Bluetooth-tag-accessible broadcast package from the Bluetooth tag 120, transmits a connection request message to the Bluetooth tag 120 and establish a connection with the Bluetooth tag 120. That is, it is possible for the gateway (e.g., the gateway 150) to transmit the wakeup signal to the first Bluetooth tag and transmit the connection request message to the first Bluetooth tag. The gateway (e.g., the gateway 160, the gateway 170) may not transmit the wakeup signal to the first Bluetooth tag, however, they transmit a connection request message to the first Bluetooth tag only after receiving the Bluetooth-tag-accessible broadcast package from the first Bluetooth tag.

According to the method for data transmission provided in this embodiment of the present disclosure, the gateway receives the Bluetooth-tag-accessible broadcast package from the first Bluetooth tag, obtains the command data of the first Bluetooth tag from the server after receiving the Bluetooth-tag-accessible broadcast package from the first Bluetooth tag, and establishes the connection with the first Bluetooth tag. After the gateway successfully establishes the connection with the first Bluetooth tag, the gateway transmits the command data to the first Bluetooth tag. According to the method for data transmission, the gateway is enabled to obtain the command data of the first Bluetooth tag from the server after receiving the Bluetooth-tag-accessible broadcast package from the first Bluetooth tag, such that the plurality of gateways which receive the Bluetooth-tag-accessible broadcast package from the first Bluetooth tag are all enabled to transmit the connection request message to the first Bluetooth tag, thereby ensuring that one of the plurality of gateways can successfully establish a connection with the first Bluetooth tag and transmit the command data to the first Bluetooth tag in time. In this way, the problem that a target gateway cannot transmit the command data to the first Bluetooth tag in time due to the fact that the target gateway is not successfully connected with the Bluetooth tag in the related art may be avoided, the reliability and the stability of data transmission are improved accordingly.

As an example, in some embodiments, the server needs to transmit the command data to a plurality of Bluetooth tags. In this situation, the gateway also receives a wakeup command of each of the at least one second Bluetooth tag from the server while receiving the wakeup command of the first Bluetooth tag from the server. The gateway transmits a wakeup signal to the first Bluetooth tag according to the wakeup command of the first Bluetooth tag and transmits a wakeup signal to each of the at least one second Bluetooth tag according to the wakeup command of the at least one second Bluetooth tag.

In the application scenario including the plurality of gateways, one gateway may transmit the wakeup signal to the first Bluetooth tag and each of the at least one second Bluetooth tag to enable the first Bluetooth tag and each of the at least one second Bluetooth tag to be in an accessible state. The plurality of Bluetooth tags are awakened by one gateway, thus, the problem of signal interference caused by waking up a plurality of Bluetooth tags at the same time through a plurality of gateways can be avoided, and the fault tolerance rate of the system is increased.

Furthermore, when the first Bluetooth tag and the at least one second Bluetooth tag are in the accessible state, the gateway further receives a Bluetooth-tag-accessible broadcast package from the at least one second Bluetooth tag while receiving the Bluetooth-tag-accessible broadcast package from the first Bluetooth tag. In this situation, the gateway transmits a connection request message to the first Bluetooth tag when the priority of the first Bluetooth tag is higher than the priority of each of the at least one second Bluetooth tag. The gateway establishes a connection with the Bluetooth tag having a higher priority first, so that a success rate of connection may be improved and a connection conflict is reduced. The gateway stops performing an operation of transmitting the connection request message to the first Bluetooth tag after receiving the Bluetooth-tag-inaccessible broadcast package from the first Bluetooth tag.

As an example, each of the Bluetooth-tag-accessible broadcast package from the first Bluetooth tag and the Bluetooth-tag-accessible broadcast package(s) corresponding to the at least one second Bluetooth tag includes sleep countdown information. The sleep countdown information indicates a countdown time duration of a corresponding Bluetooth tag for entering the sleep mode. If the countdown time duration indicated by the sleep countdown information corresponding to the first Bluetooth tag is shorter than the countdown time duration indicated by the sleep countdown information corresponding to each of the at least one second Bluetooth tag, it indicates that the priority of the first Bluetooth tag is higher than the priority of each of the at least one second Bluetooth tag.

For example, the gateway receives Bluetooth-tag-accessible broadcast packages from three second Bluetooth tags while receiving the Bluetooth-tag-accessible broadcast packages from the first Bluetooth tag. The sleep countdown information in the Bluetooth-tag-accessible broadcast package from the first Bluetooth tag is 10 s, the sleep countdown information in the Bluetooth-tag-accessible broadcast package of the first second Bluetooth tag is 30 s, the sleep countdown information in the Bluetooth-tag-accessible broadcast package of the second Bluetooth tag is 20 s, the sleep countdown information in the Bluetooth-tag-accessible broadcast package of the third second Bluetooth tag is 15 s, the priority of the first Bluetooth tag is higher than that of the third second Bluetooth tag, the priority of the third second Bluetooth tag is higher than that of the second Bluetooth tag, and the priority of the second Bluetooth tag is higher than that of the first second Bluetooth tag.

As an example, the gateway may further determine a signal strength value of the Bluetooth-tag-accessible broadcast package from the first Bluetooth tag and a signal strength value of the Bluetooth-tag-accessible broadcast package from each of the at least one second Bluetooth tag. When the signal strength value corresponding to the first Bluetooth tag is greater than the signal strength value corresponding to each of the at least one second Bluetooth tag, it indicates that the priority of the first Bluetooth tag is higher than the priority of each of the at least one second Bluetooth tag.

For example, the gateway receives the Bluetooth-tag-accessible broadcast package from the first Bluetooth tag while receiving the Bluetooth-tag-accessible broadcast packages from the three second Bluetooth tags. The signal strength value of the Bluetooth-tag-accessible broadcast package from the first Bluetooth tag is −50 dBm, the signal strength value of the Bluetooth-tag-accessible broadcast package of the first second Bluetooth tag is −55 dBm, the signal strength value of the Bluetooth-tag-accessible broadcast package of the second Bluetooth tag is −63 dBm, the signal strength value of the Bluetooth-tag-accessible broadcast package of the third second Bluetooth tag is −68 dBm. In this situation, the priority of the first Bluetooth tag is higher than that of the first second Bluetooth tag, the priority of the first second Bluetooth tag is higher than that of the second Bluetooth tag, and the priority of the second Bluetooth tag is higher than that of the third second Bluetooth tag.

A method for data transmission implemented by a first Bluetooth tag provided in one embodiment of the present disclosure is described below with reference to FIG. 4. As shown in FIG. 4, the method for data transmission includes:

At step 410, the first Bluetooth tag broadcasts a Bluetooth-tag-accessible broadcast package after monitoring a wakeup signal.

At step 420, the first Bluetooth tag receives a plurality of connection request messages from a plurality of gateways.

At step 430, the first Bluetooth tag transmits a connection request acknowledgement message to a target gateway.

At step 440, command data from the target gateway is received by the first Bluetooth tag.

In the application scenario including the plurality of gateways, the first Bluetooth tag broadcasts the Bluetooth-tag-accessible broadcast package, the plurality of gateways may transmit the connection request message to the first Bluetooth tag respectively after receiving the Bluetooth-tag-accessible broadcast package from the first Bluetooth tag. That is, the first Bluetooth tag may receive a plurality of connection request messages from the plurality of gateways. The plurality of gateways correspond to the plurality of connection request messages, respectively. The target gateway is a gateway corresponding to one of the plurality of connection request messages which is received first by the first Bluetooth tag. For example, in the application scenario shown in FIG. 1, the gateway 150, the gateway 160, and the gateway 170 transmit a connection request message to the Bluetooth tag 120 respectively. If the Bluetooth tag 120 first receives the connection request message from the gateway 150, the gateway 150 is the target gateway.

In order to prevent a gateway from repeatedly connecting the first Bluetooth tag, after the first Bluetooth tag transmits the connection request acknowledgement message to the target gateway, the first Bluetooth tag broadcasts a Bluetooth-tag-inaccessible broadcast package. The Bluetooth-tag-inaccessible broadcast package is used to indicate that the first Bluetooth tag is in an inaccessible state. The gateway stops transmitting the connection request message to the first Bluetooth tag after receiving the Bluetooth-tag-inaccessible broadcast package from the first Bluetooth tag.

Figure 5:
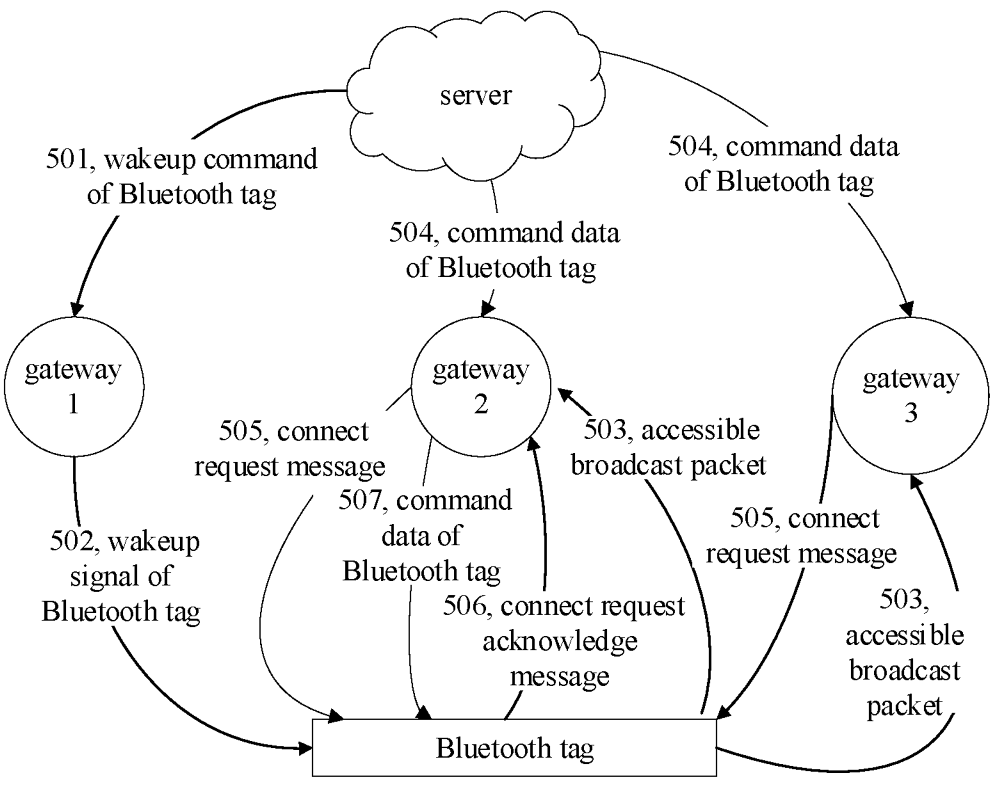
FIG. 5 illustrates schematic diagram of detailed implementation process of the method for data transmission provided in one embodiment of the present disclosure.

The method for data transmission provided in this embodiment of the present disclosure is described in detail below with reference to FIG. 5. As an example, as shown in FIG. 5, in the application scenario including three gateways and one Bluetooth tag, when the server needs to transmit command data to the Bluetooth tag, the server transmits a wakeup command of the Bluetooth tag to one of the three gateways (e.g., the gateway 1), that is, the server performs the step 501. After the gateway 1 receives the wakeup command of the Bluetooth tag from the server, the gateway 1 transmits a wakeup signal to the Bluetooth tag to enable the Bluetooth tag to be in an accessible state (the Bluetooth tag broadcasts the Bluetooth-tag-accessible broadcast package). That is, the gateway 1 performs the step 502, and the Bluetooth tag performs the step 503. The gateway 2 and the gateway 3 obtain the command data of the Bluetooth tag from the server after receiving the Bluetooth-tag-accessible broadcast package from the Bluetooth tag. That is, after the gateway 2 and the gateway 3 both execute step 504, both the gateway 2 and the gateway 3 transmits a connection request message to the Bluetooth tag. That is, both the gateway 2 and the gateway 3 perform the step 505. Then, the gateway 2 and the gateway 3 transmit a connection request message to the Bluetooth tag respectively, that is, both the gateway 2 and the gateway 3 perform the step 505. The Bluetooth tag receives the connection request message from the gateway 2 and the connection request message from the gateway 3, and transmits a connection request acknowledgement message to the target gateway (e.g., the gateway 2). That is, the Bluetooth tag performs the step 506. The gateway 2 transmits the command data of the Bluetooth tag to the Bluetooth tag after receiving the connection request acknowledgement message from the Bluetooth tag. That is, the gateway 2 performs the step 507.

In one embodiment, the target gateway is determined as the gateway 2 if the Bluetooth tag receives the connection request message from the gateway 2 first. The target gateway is determined as the gateway 3 if the Bluetooth tag receives the connection request message from the gateway 3 first. The Bluetooth tag broadcasts the Bluetooth-tag-inaccessible broadcast package after the connection between the Bluetooth tag and the target gateway (e.g., the gateway 2) is successfully established. The gateway 3 stops transmitting the connection request message to the Bluetooth tag after receiving the Bluetooth-tag-inaccessible broadcast package.

Figure 6:
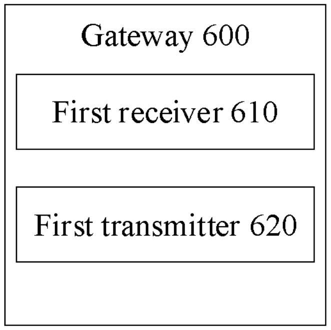
FIG. 6 illustrates a schematic block diagram of a gateway provided in one embodiment of the present disclosure.

In order to implement the aforesaid embodiments, a gateway 600 is further provided in the present disclosure. As shown in FIG. 6, the gateway 600 includes a first receiver 610 and a first transmitter 620.

The first receiver 610 is configured to receive a Bluetooth-tag-accessible broadcast package from the first Bluetooth tag. The gateway does not receive command data of the first Bluetooth tag from a server before receiving the Bluetooth-tag-accessible broadcast package from the first Bluetooth tag, the command data is used to transmit data, and the Bluetooth-tag-accessible broadcast package is used to indicate that a Bluetooth tag is in an accessible state. The first transmitter 620 is configured to transmit a connection request message to the first Bluetooth tag according to the Bluetooth-tag-accessible broadcast package from the first Bluetooth tag. The first transmitter 620 is further configured to transmit the command data to the first Bluetooth tag when receiving a connection request acknowledgement message from the first Bluetooth tag. The command data is obtained by the gateway from the server after the Bluetooth-tag-accessible broadcast package from the first Bluetooth tag is received by the gateway.

In one embodiment, the gateway 600 further includes a processor, the first receiver 610 is further configured to receive Bluetooth-tag-accessible broadcast package(s) from at least one second Bluetooth tag. Both the Bluetooth-tag-accessible broadcast package from the first Bluetooth tag and the Bluetooth-tag-accessible broadcast package(s) corresponding to the at least one second Bluetooth tag include sleep countdown information, the sleep countdown information indicates a countdown time for triggering the corresponding Bluetooth tag to enter a sleep mode. The first transmitter 620 is particularly configured to transmit a connection request message to the first Bluetooth tag when the processor determines that a time duration indicated by the sleep countdown information corresponding to the first Bluetooth tag is less than a time duration indicated by the sleep countdown information corresponding to each of the at least one second Bluetooth tag.

In one embodiment, the gateway 600 further includes a processor, and the first receiver 610 is further configured to receive a Bluetooth-tag-accessible broadcast package from the at least one second Bluetooth tag. The processor is configured to determine a signal strength value of the Bluetooth-tag-accessible broadcast package from the first Bluetooth tag and a signal strength value of the Bluetooth-tag-accessible broadcast package from each of the at least one second Bluetooth tag. The first transmitter 620 is particularly configured to transmit a connection request message to the first Bluetooth tag when the processor determines that the signal strength value corresponding to the first Bluetooth tag is greater than the signal strength value corresponding to each of the at least one second Bluetooth tag.

In one embodiment, before the Bluetooth-tag-accessible broadcast package from the first Bluetooth tag is received by the first receiver 610, the first receiver 610 is further configured to: receive a wakeup command of the first Bluetooth tag from the server. The first transmitter 620 is further configured to transmit a wakeup signal to the first Bluetooth tag according to the wakeup command of the first Bluetooth tag. The wakeup signal is used to enable the Bluetooth tag to be awakened from the sleep state.

In one embodiment, before the Bluetooth-tag-accessible broadcast package from the first Bluetooth tag and the Bluetooth-tag-accessible broadcast package of the at least one second Bluetooth tag are received by the first receiver 610, the first receiver 610 is further configured to: receive a wakeup command of the first Bluetooth tag and a wakeup command of each of the at least one second Bluetooth tag from the server. The first transmitter 620 is further configured to transmit a wakeup signal to the first Bluetooth tag according to the wakeup command of the first Bluetooth tag and transmit a wakeup signal to each of the at least one second Bluetooth tag according to the wakeup command of each of the at least one second Bluetooth tag. The wakeup signal is used to enable the Bluetooth tag to be awakened from the sleep state.

In one embodiment, the first transmitter 620 is further configured to stop transmitting a connection request message to the first Bluetooth tag when receiving the Bluetooth-tag-inaccessible broadcast package from the first Bluetooth tag. The Bluetooth-tag-inaccessible broadcast package is used to indicate that the first Bluetooth tag is in an inaccessible state.

In one embodiment, the gateway is within a preset distance range of the first Bluetooth tag.

Figure 7:
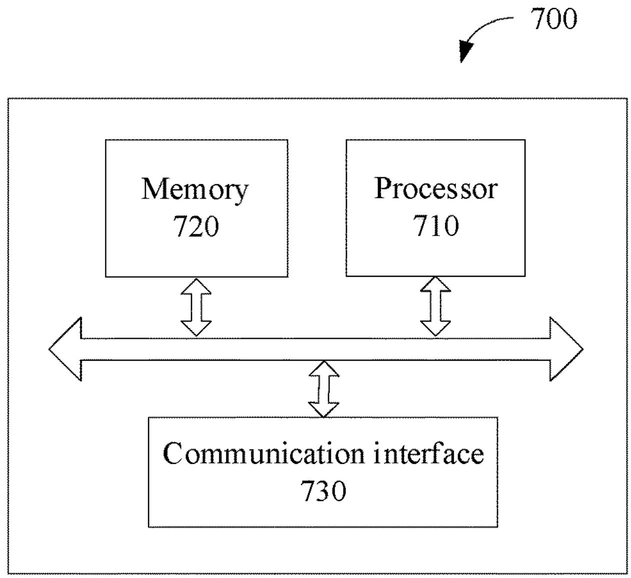
FIG. 7 illustrates a structural block diagram of the gateway provided in one embodiment of the present disclosure.

A gateway 700 is further provided in the present disclosure. As shown in FIG. 7, the gateway 700 includes a processor 710, a memory 720, and a communication interface 730. The memory 720 stores instructions, the processor 710 is configured to execute the instructions in the memory 720. The processor 710 is configured to, when executing the instructions, perform the method for data transmission provided in the aforesaid method embodiments. The processor 710 is further configured to control the communication interface 730 to communicate with the outside.

It should be understood that, in the embodiments of the present disclosure, the processor can be central processing unit (CPU), and can also be other general purpose processor, digital signal processor (DSP), application specific integrated circuit (ASIC), field-programmable gate array (FGPA), or some other programmable logic devices, discrete gate or transistor logic device, discrete hardware component, etc. The general purpose processor may be a microprocessor, as an alternative, the processor can also be any conventional processor, or the like.

It should be understood that, the memory in the embodiments of the preset disclosure may be a volatile or a non-volatile memory. Alternatively, the memory may include the volatile memory and the non-volatile memory. The non-volatile memory can be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that serves as an external cache. By way of illustration rather than limitation, RAM in various forms are available, the RAM in various forms may be, such as a static random access memory (SRAM), a dynamic random access memory (DRAM), a synchronous dynamic random access memory (SDRAM), a double data date SDRAM (DDR SDRAM), an enhanced synchronous dynamic random access memory (ESDRAM), a synchlink dynamic random access memory (SLDRAM) and a direct rambus random access memory (DR RAM).

Figure 8:
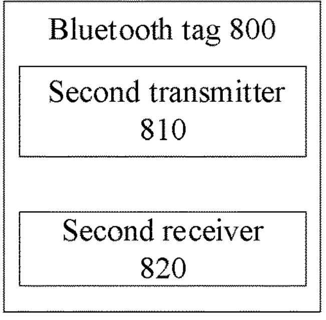
FIG. 8 illustrates a schematic block diagram of a Bluetooth tag provided in one embodiment of the present disclosure.

A Bluetooth tag 800 is further provided in the present disclosure. As shown in FIG. 8, the Bluetooth tag 800 includes a second transmitter 810 and a second receiver 820.

The second transmitter 810 is configured to broadcast a Bluetooth-tag-accessible broadcast package after monitoring a wakeup signal, the Bluetooth-tag-accessible broadcast package is used to indicate that the Bluetooth tag 800 is in an accessible state. The second receiver 820 is configured to receive a plurality of connection request messages from a plurality of gateways, respectively. The second transmitter 810 is further configured to transmit a connection request acknowledgement message to a target gateway, the target gateway is a gateway corresponding to one of the plurality of connection request messages which is first received by a first Bluetooth tag. The second receiver 820 is further configured to receive command data from the target gateway.

Optionally, after the second transmitter 810 transmits the connection request acknowledge message to the target gateway, the second transmitter 810 is further configured to broadcast a Bluetooth-tag-inaccessible broadcast package, the Bluetooth-tag-inaccessible broadcast package is used to indicate that a Bluetooth tag is in an inaccessible state.

Figure 9:
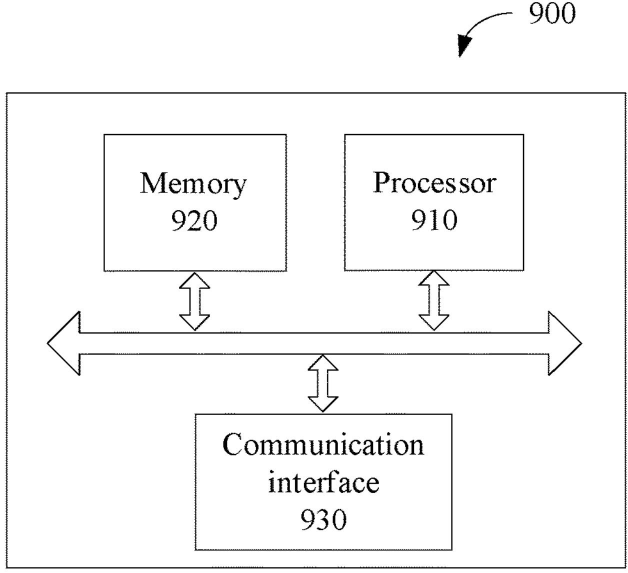
FIG. 9 illustrates a structural block diagram of the Bluetooth tag provided in one embodiment of the present disclosure.

A Bluetooth tag 900 is further provided in the present disclosure. As shown in FIG. 9, the Bluetooth tag 900 includes: a processor 910, a memory 920 and a communication interface 930. The memory 920 stores instructions, the processor 910 is configured to execute the instructions in the memory 920. The processor 910 is configured to, when the instructions are executed, perform the method for data transmission provided in the aforesaid method embodiments. The processor 910 is further configured to control the communication interface 930 to communicate with the outside.

A non-transitory computer-readable storage medium is further provided in the present disclosure, the computer-readable storage medium stores a computer program, that, when being executed by a computer, causes the computer to perform the method for data transmission provided in the aforesaid method embodiments.

A system on chip (SOC) is further provided, the SOC includes a processor configured to invoke and execute a computer program in a memory to cause a device installed with the SOC to perform the method for data transmission provided in the aforesaid method embodiments.

A computer program product including instructions is further provided in the embodiments of the present disclosure. When the computer program product is executed on the computer, the computer is caused to perform the method for data transmission provided in the aforesaid method embodiments.

The person of ordinary skill in the art may understand that, the elements and algorithm steps of each of the examples described in connection with the embodiments disclosed herein may be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present disclosure.

It may be clearly understood by the person of ordinary skill in the art that, for the convenience of describing and concisely, regarding the detailed working processes of the system, the apparatus and the units described above, reference can be made to the corresponding process in the previously described method embodiments, the detailed working processes of the system, the apparatus and the units are not repeatedly described herein.

It should be understood that, in the embodiments of the present disclosure, the disclosed system/apparatus and the methods could be implemented in other ways. For example, the apparatus embodiment described above is merely illustrative. For example, the division of the units is only a logical function division, and other division could be used in the actual implementation, for example, multiple units or components could be combined or integrated into another system, or some features may be ignored, or not performed. In another aspect, the coupling or direct coupling or communicating connection shown or discussed could be an indirect coupling or a communicating connection through some interfaces, devices or units, and the coupling or direct coupling or communicating connection could be electrical, mechanical, or in other form.

The units described as separate components can be or cannot be physically separate, the components shown as units can be or cannot be physical units, the components may be located in one place, or be distributed onto multiple network elements. A part or a whole of the elements can be selected to achieve the objective of the technical solution of this embodiment according to the actual requirement.

In addition, the various functional units in each of the embodiments of the present disclosure may be integrated into a single processing unit, or exist individually and physically, or two or more than two units are integrated into a single unit.

If the functionalities are achieved in the form of software functional units, and are sold or used as an independent product, they may be stored in a computer readable storage medium. Based on this understanding, the technical solution of the present disclosure, or the part that is contributable to related art, or a part of the technical solution may be embodied in the form of software product essentially, the computer softer product is stored in a storage medium and includes an instruction that enables a computer device (which may be a personal computer, a server, or a network device, and the like) to execute all or part of steps of methods in the various embodiments of the present disclosure. The aforesaid storage medium includes: various mediums capable of storing program codes such as USB flash disk, mobile hard disk, computer memory, ROM (Read-Only Memory), RAM (Random Access Memory), hard disk, optical disk, and the like.

The aforesaid embodiments are only some specific embodiments of the present disclosure. However, the protection scope of the present disclosure is not limited by these embodiments. Changes or replacements, which can be readily conceivable to a person of ordinary skill in the art who is familiar with the technical field of the present disclosure, should all be included in the protection scope of the present disclosure. Thus, the protection scope of the present disclosure should be determined by the protection scope of the claims.

What is claimed is:

1. A method for data transmission, comprising:

receiving, by a gateway, a Bluetooth-tag-accessible broadcast package from a first Bluetooth tag, wherein the gateway does not receive command data of the first Bluetooth tag from a server before receiving the Bluetooth-tag-accessible broadcast package from the first Bluetooth tag, the command data is used for transmitting data, and the Bluetooth-tag-accessible broadcast package is used to indicate that the Bluetooth tag is in an accessible state;

transmitting, by the gateway, a connection request message to the first Bluetooth tag according to the Bluetooth-tag-accessible broadcast package from the first Bluetooth tag, wherein when the first Bluetooth tag and at least one second Bluetooth tag are in the accessible state, the gateway receives the Bluetooth-tag-accessible broadcast package from the at least one second Bluetooth tag while receiving the Bluetooth-tag-accessible broadcast package from the first Bluetooth tag, and transmits the connection request message to the first Bluetooth tag when a priority of the first Bluetooth tag is higher than a priority of each of the at least one second Bluetooth tag;

receiving, by the first Bluetooth tag, a plurality of connection request messages from a plurality of gateways respectively, and transmitting, by the first Bluetooth tag, a connection request acknowledge message to a target gateway, the target gateway being a gateway corresponding to one of the plurality of connection request messages which is first received by the first Bluetooth tag;

transmitting, by the target gateway, the command data to the first Bluetooth tag when receiving the connection request acknowledgement message from the first Bluetooth tag, wherein the command data is obtained by the gateway from the server, after receiving the Bluetooth-tag-accessible broadcast package from the first Bluetooth tag;

the method further comprising:

broadcasting a Bluetooth-tag-inaccessible broadcast package by the first Bluetooth tag after transmitting, by the first Bluetooth tag, the connection request acknowledge message to the target gateway.

2. The method according to claim 1, wherein both the Bluetooth-tag-accessible broadcast package from the first Bluetooth tag and the Bluetooth-tag-accessible broadcast package from each of the at least one second Bluetooth tag comprise sleep countdown information, the countdown information indicates a countdown time for triggering a corresponding Bluetooth tag to enter a sleep mode;

wherein said transmitting, by the gateway, the connection request message to the first Bluetooth tag according to the Bluetooth-tag-accessible broadcast package from the first Bluetooth tag comprises:

transmitting, by the gateway, the connection request message to the first Bluetooth tag, when the countdown time duration indicated by the sleep countdown information corresponding to the first Bluetooth tag is less than a countdown time duration indicated by the sleep countdown information corresponding to each of the at least one second Bluetooth tag.

3. The method according to claim 1, further comprising:

by the gateway, receiving Bluetooth-tag-accessible broadcast package(s) from the at least one second Bluetooth tag, and determining a signal strength value of the Bluetooth-tag-accessible broadcast package from the first Bluetooth tag and a signal strength value of the Bluetooth-tag-accessible broadcast package from each of the at least one second Bluetooth tag, when the Bluetooth-tag-accessible broadcast package from the first Bluetooth tag is received by the gateway;

wherein said transmitting, by the gateway, the connection request message to the first Bluetooth tag according to the Bluetooth-tag-accessible broadcast package from the first Bluetooth tag comprises:

transmitting, by the gateway, the connection request message to the first Bluetooth tag, when the signal strength value corresponding to the first Bluetooth tag is greater than the signal strength value corresponding to each of the at least one second Bluetooth tag.

4. The method according to claim 1, wherein before the Bluetooth-tag-accessible broadcast package from the first Bluetooth tag is received by the gateway, the method further comprises:

receiving, by the gateway, a wakeup command of the first Bluetooth tag from the server; and transmitting, by the gateway, a wakeup signal to the first Bluetooth tag according to the wakeup command of the first Bluetooth tag, wherein the wakeup signal is used to enable the Bluetooth tag to be awakened from a sleep state.

5. The method according to claim 2, wherein before receiving the Bluetooth-tag-accessible broadcast package from the first Bluetooth tag and the Bluetooth-tag-accessible broadcast package(s) from the at least one second Bluetooth tag by the gateway, the method further comprises:

receiving, by the gateway, a wakeup command of the first Bluetooth tag and a wakeup command of each of the at least one second Bluetooth tag from the server; and transmitting, by the gateway, a wakeup signal to the first Bluetooth tag according to the wakeup command of the first Bluetooth tag, and transmitting, by the gateway, a wakeup signal to each of the at least one second Bluetooth tag according to the wakeup command of each of the at least one second Bluetooth tag, wherein the wakeup signal is used to enable the Bluetooth tag to be awakened from a sleep state.

6. The method according to claim 1, further comprising:

stopping transmitting the connection request message to the first Bluetooth tag by the gateway when receiving the Bluetooth-tag-inaccessible broadcast package from the first Bluetooth tag, wherein the Bluetooth-tag-inaccessible broadcast package is used to indicate that the Bluetooth tag is in an inaccessible state.

7. A method for data transmission, comprising:

broadcasting a Bluetooth-tag-accessible broadcast package by a first Bluetooth tag after a wakeup signal is monitored by the first Bluetooth tag, wherein the Bluetooth-tag-accessible broadcast package is used to indicate that the Bluetooth tag is in an accessible state;

receiving, by the first Bluetooth tag, a plurality of connection request messages from a plurality of gateways respectively; wherein when the first Bluetooth tag and at least one second Bluetooth tag are in the accessible state, each gateway receives the Bluetooth-tag-accessible broadcast package from the at least one second Bluetooth tag while receiving the Bluetooth-tag-accessible broadcast package from the first Bluetooth tag, and transmits a connection request message to the first Bluetooth tag when a priority of the first Bluetooth tag is higher than a priority of each of the at least one second Bluetooth tag;

transmitting a connection request acknowledgement message to a target gateway by the first Bluetooth tag, wherein the target gateway is a gateway corresponding to one of the plurality of connection request messages which is first received by the first Bluetooth tag; and receiving, by the first Bluetooth tag, command data from the target gateway, wherein the command data is used for transmitting data;

the method further comprising:

broadcasting a Bluetooth-tag-inaccessible broadcast package by the first Bluetooth tag after said transmitting, by the first Bluetooth tag, the connection request acknowledge message to the target gateway, wherein the Bluetooth-tag-inaccessible broadcast package is used to indicate that the Bluetooth tag is in an inaccessible state.

8. A gateway, comprising:

a memory configured to store instructions;

a communication interface; and a processor configured to, when executing the instructions stored in the memory, perform the method for data transmission according to claim 1.

* * * * *